UNITED STATES PATENT OFFICE.

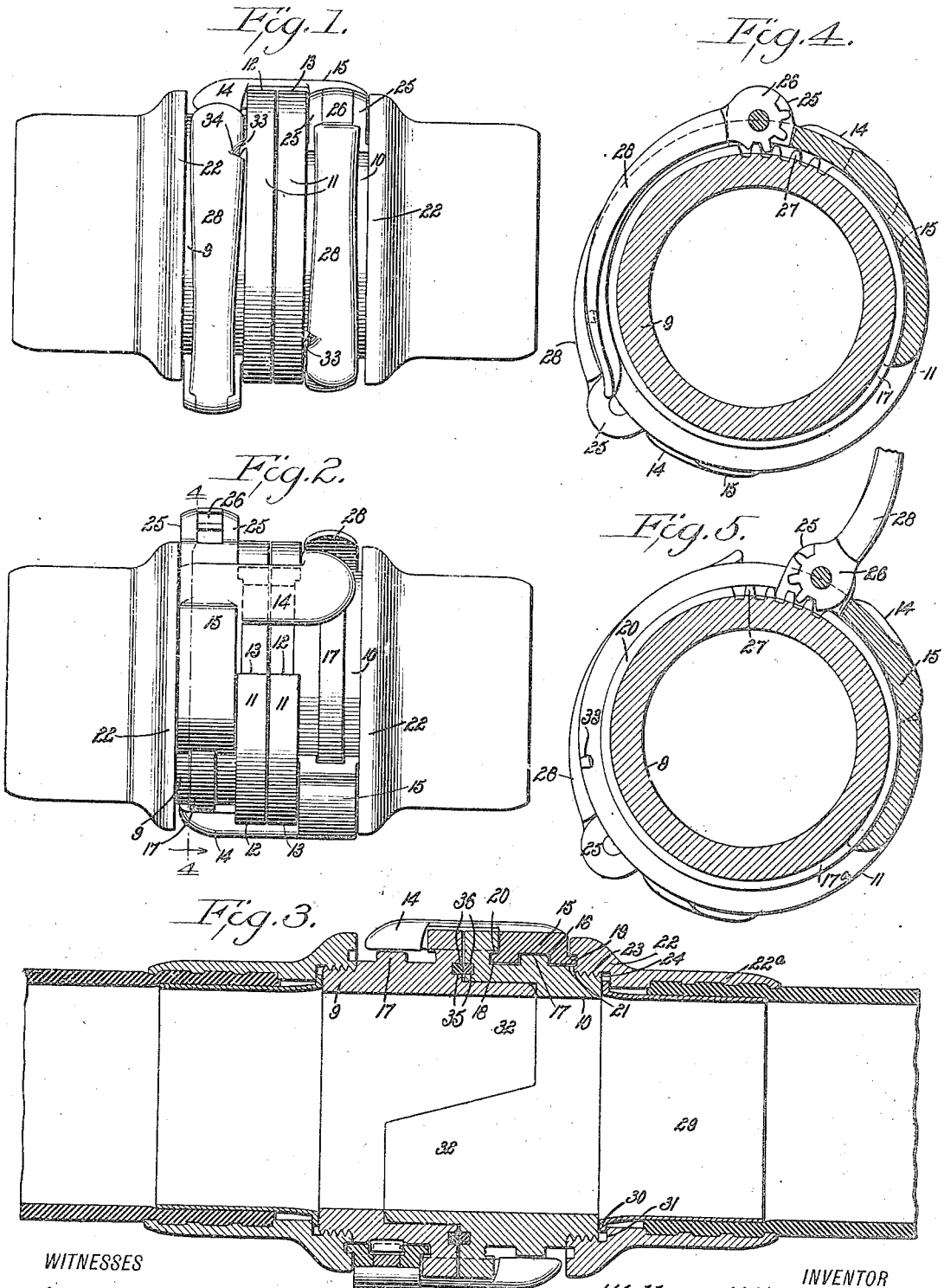

WILLIAM KEMPTON KENNARD, OF BANGOR, MAINE, ASSIGNOR OF ONE-HALF TO SAMUEL S. KIMBALL, OF BANGOR, MAINE.

COUPLING FOR HOSE AND PIPES.

1,236,182.   Specification of Letters Patent.   Patented Aug. 7, 1917.

Application filed March 10, 1916.   Serial No. 83,270.

*To all whom it may concern:*

Be it known that I, WILLIAM K. KENNARD, a citizen of the United States, and a resident of Bangor, in the county of Penobscot and State of Maine, have invented a new and Improved Coupling for Hose and Pipes, of which the following is a full, clear, and exact description.

My invention has for its object to provide a coupling for hose and pipes, which may be quickly operated under all conditions. The coupling members are provided with dogs for engaging rims on the companion coupling members, the dogs being operable by levers through the instrumentality of gearing.

Additional objects of the invention will appear in the following specification, in which the preferred form of my invention is described.

In the drawings similar reference characters refer to similar parts in all the views, in which, Figure 1 is a side elevation of the invention;

Fig. 2 is a rear view of Fig. 1;

Fig. 3 is a longitudinal sectional view of Fig. 1;

Fig. 4 is a sectional view on the line 4 of Fig. 2; and

Fig. 5 is a sectional view similar to that shown in Fig. 4, but with the parts shown in open position.

By referring to the drawings, it will be seen that each of the coupling members 9 and 10 has a circular rim 11, provided with two openings 12 and 13, each of the coupling members being provided with a dog 14, which extends through the opening 13 and which is adapted to extend through the opening 12 on the companion coupling member, as will be seen by referring to Fig. 2 of the drawings. Each of the dogs 14 is secured on a base 15, this base 15 having a channel 16 for receiving a bead 17. Each of the bases 15 also has longitudinal flanges 18 and 19, the flanges 18 being disposed in guideways 20 in the rims 11 and the flanges 19 being disposed in guideways 21 in collars 22 which have threads 23, which mesh with threads 24, with which the coupling members 9 and 10 are provided. It will therefore be seen that the dogs 14 may have a limited rotary movement relatively to the coupling members 9 and 10 and that the movements of the dogs 14 will be guided by the guideways 20 and 21 with which the coupling members 9 and 10 are provided.

When the dogs 14 project through the rim openings 12 on the companion coupling members, the dogs 14 may be moved so that they will engage the ends of the rims 11 on the companion coupling members at the openings 12 therein, it being possible to lock the coupling members 9 and 10 together by this means. The bases 15 of the dogs 14 are provided with ears 25, to which gears 26 are pivoted, the gears 26 meshing with teeth 27 on the coupling members 9 and 10, so that with a rotary movement of the gears 26, the dogs 14 may be operated to engage or disengage the rims 11 on the companion coupling members. The said gears 26 are rotated by means of curved levers 28, which are disposed between the rims 11 and the collars 22 when the dogs are in locked position.

It will be seen that the dogs 14 with their bases 15 may be removed from the coupling members 9 and 10 by unscrewing the collars 22.

It will also be seen that hose may be clamped between the outwardly projecting portions 22ª of the collars 22 and annular clamping members 29, which have flanges 30, which are normally engaged by the shoulders 31 on the collars 22.

As a means of guiding the coupling members 9 and 10 in their proper positions and as a means of preventing the rotation of one of the coupling members relatively to the other, I provide the coupling members with tongues 32, the tongue 32 on each coupling member projecting into the companion coupling member to act as a guide, these tongues 32 locking with each other when the coupling members 9 and 10 are in normal position to prevent their rotation.

There is a boss 33 on each rim 11 under which the levers 28 may be disposed at notches 34 therein, this means being provided to hold the curved levers 28 in locked position.

In each of the coupling members 9 and 10 there is an annular recess 35 in which a gasket 36 is disposed, these gaskets 36 engaging each other when the coupling members 9 and 10 are clamped together to prevent any possible leak.

Having thus described my invention, I claim as new and desire to secure by Letters Patent:

1. In a coupling, a coupling member having a rim, a second coupling member, a dog movably mounted on the second coupling member for engaging the rim on the first coupling member, a lever, mounted on an axis extending longitudinally of the coupling, and means connecting the lever with the dog for operating the latter.

2. In a coupling, a coupling member having a rim, a second coupling member having teeth, a dog movably mounted on the second coupling member for engaging the rim on the first coupling member, and a gear mounted on the dog and meshing with the teeth on the second coupling member for the purpose specified.

3. In a coupling, a coupling member having an arm, a second coupling member having an annular guide, a dog for engaging the arm in the first coupling member and provided with a base movable in the annular guide, teeth on the second coupling member, and a gear mounted on the dog on an axis extending longitudinally of the coupling, the gear meshing with the teeth for the purpose specified.

4. In a coupling, a coupling member having a rim, a second coupling member having an annular guide, a dog for engaging the rim on the first coupling member and provided with a base movable in the annular guide, a lever, mounted on an axis extending longitudinally of the coupling, means connecting the lever with the dog for operating the latter, and means to prevent the rotation of one coupling member relatively to the other.

5. In a coupling, a coupling member having a rim, a second coupling member having an annular guide, a dog for engaging the rim on the first coupling member and provided with a base movable in the annular guide, teeth on the second coupling member, and a gear on the dog meshing with the teeth for the purpose specified.

6. In a coupling, a coupling member having a rim, a second coupling member having teeth and an annular guideway, a dog for engaging the rim on the first coupling member and provided with a base movable in the annular guideway, a gear on the dog meshing with the teeth, and a lever on the gear for operating the latter.

7. In a coupling, a hollow coupling member having a rim, a companion hollow coupling member having teeth and an annular guideway, tongues on the coupling members for engaging each other to guide the coupling members into normal position and to prevent their rotation relatively to each other, a dog for engaging the rim on the first coupling member and provided with a base movable in the annular guideway, a gear on the dog meshing with the teeth, and a lever secured to the gear for operating the latter.

8. In a coupling, two coupling members each having a circular rim with two openings therein, a circular guideway adjacent the rim, a dog projecting through one of the rim openings and with a base movably disposed in the guideway, the dogs on the coupling members being normally disposed through the other openings in the circular rims on the companion coupling members, and means for rotating the dogs for engaging the circular rims on the companion members at the said other openings therein.

9. In a coupling, two coupling members each having teeth, a circular rim with two openings therein, a circular guideway adjacent the rim, and a dog projecting through one of the rim openings and with a base movably disposed in the guideway, the coupling members being normally disposed through the other openings in the circular rims on the companion coupling members, and gears mounted on the dogs for engaging the teeth for the purpose specified.

10. In a coupling, two coupling members each having teeth, a circular rim with two openings therein, a circular guideway adjacent the rim, and a dog projecting through one of the rim openings and with a base movably disposed in the guideway, the coupling members being normally disposed through the other openings in the circular rims on the companion coupling members, gears mounted on the dogs for engaging the teeth, and levers secured to the gears for operating the latter.

11. In a coupling, two coupling members each having a circular rim with two openings therein, a circular guideway adjacent the rim, a dog projecting through one of the rim openings and with a base movably disposed in the guideway, the dogs on the coupling members being normally disposed through the other openings in the circular rims on the companion coupling members, levers, and means connecting the levers with the dogs for operating the latter.

12. In a coupling, two coupling members each having a circular rim with two openings therein, a circular guideway adjacent the rim, and a dog projecting through one of the rim openings and with a base disposed in the guideway, the dogs on the coupling members being normally disposed through the other openings in the circular rims on the companion coupling members, and tongues on the coupling members for guiding the coupling members into normal position and for preventing the rotation of the coupling members relatively to each other.

13. In a coupling, a coupling member having a rim, a second coupling member having a rim with a guideway therein, a detachable collar on the second coupling member having a guideway therein disposed opposite the first guideway, a dog having a base mounted in the guideways, the dog being provided for engaging the rim on the first coupling member, teeth on the second coupling member, and a gear mounted on the dog and meshing with the teeth.

In testimony whereof I have signed my name to this specification in the presence of two subscribing witnesses.

WILLIAM KEMPTON KENNARD.

Witnesses:
WARREN E. CRAIG,
DAVID J. NASON.